(12) United States Patent
Guzmann et al.

(10) Patent No.: US 8,246,857 B2
(45) Date of Patent: Aug. 21, 2012

(54) CHEMICAL COMPOSITION USEFUL AS CORROSION INHIBITOR

(75) Inventors: Marcus Guzmann, Muehlhausen (DE); Uwe Ossmer, Neustadt (DE); Henry Craddock, Kirriemuir Angus (GB)

(73) Assignee: BASF Aktiengesellschaft, Ludwigshafen (DE)

( * ) Notice: Subject to any disclaimer, the term of this patent is extended or adjusted under 35 U.S.C. 154(b) by 198 days.

(21) Appl. No.: 12/095,811

(22) PCT Filed: Nov. 29, 2006

(86) PCT No.: PCT/EP2006/069025
§ 371 (c)(1),
(2), (4) Date: Jun. 2, 2008

(87) PCT Pub. No.: WO2007/063069
PCT Pub. Date: Jun. 7, 2007

(65) Prior Publication Data
US 2008/0272342 A1    Nov. 6, 2008

(30) Foreign Application Priority Data
Dec. 2, 2005  (EP) .................................. 05026281

(51) Int. Cl.
*C23F 11/10*  (2006.01)
*C09K 8/54*   (2006.01)

(52) U.S. Cl. .................. 252/392; 252/396; 507/939

(58) Field of Classification Search .................. 252/392
See application file for complete search history.

(56) References Cited

U.S. PATENT DOCUMENTS

| | | | |
|---|---|---|---|
| 4,414,128 A * | 11/1983 | Goffinet ........................ | 510/405 |
| 5,510,038 A   | 4/1996  | Wegmuller | |
| 5,531,934 A * | 7/1996  | Freeman et al. ............. | 252/390 |
| 5,648,327 A * | 7/1997  | Smerznak et al. ............ | 510/340 |
| 5,783,539 A   | 7/1998  | Angevaare et al. | |
| 5,942,150 A   | 8/1999  | Heuer et al. | |
| 6,147,048 A   | 11/2000 | Huff et al. | |
| 2003/0151022 A1 | 8/2003 | Bragulla et al. | |

FOREIGN PATENT DOCUMENTS

| | | |
|---|---|---|
| CH | 686 040 | 12/1995 |
| DE | 195 30 203 | 2/1997 |
| DE | 196 14 565 | 10/1997 |
| DE | 196 20 364 | 11/1997 |
| EP | 1 464 627 | 10/2004 |
| JP | 56-98482 | 8/1981 |
| WO | WO 86/06417 | 11/1986 |
| WO | WO 2004/015051 | 2/2004 |

OTHER PUBLICATIONS

Min Du, et al.; "The New-generation of Green Surfactant (Alkylpolyglucoside) as an Inhibitor to the Corrosion of 907 Steel in Seawater"; Aug. 2004; Chinese Chemical Letter; vol. 15, No. 8. pp. 985-988.

* cited by examiner

*Primary Examiner* — Peter F Godenschwager
(74) *Attorney, Agent, or Firm* — Oblon, Spivak, McClelland, Maier & Neustadt, L.L.P.

(57) ABSTRACT

The present invention relates to a chemical composition comprising (a) a glycoside component A comprising at least one glycoside of the formula R(OG)x wherein R is an aliphatic hydrocarbon radical having 1 to 25 carbon atoms or is a radical of formula $R^1(OR^2)_m$ which does not have more than 25 carbon atoms and wherein n=0 to 24 and $R^1$ and $R^2$ are aliphatic hydrocarbon radicals; G is the residue of a saccharide moiety selected from the group consisting of fructose, glucose, mannose, galactose, talose, gulose, allose, altrose, idose, arabinose, xylose, lyxose, ribose and alkoxylated derivatives thereof; and x is 1 to 30; (b) an aspartate component B comprising at least one polymerisation product of aspartic acid, optionally in form of a copolymerisate with fatty acids, polybasic carboxylic acids, anhydrides of polybasic carboxylic acids, polybasic hydroxycarboxylic acids, monobasic polyhydroxycarboxylic acids, alkoxylated alcohols, alkoxylated amines, amino sugars, carbohydrates, sugar carboxylic acids and polymers thereof. The invention further relates to the use of such chemical compositions as corrosion inhibitor.

9 Claims, No Drawings

CHEMICAL COMPOSITION USEFUL AS CORROSION INHIBITOR

The present invention relates to chemical compositions and their use as corrosion inhibitors.

As regulations regarding environmental impact of chemicals in the offshore oil industry change, operators are required to give priority to those products with superior environmental categorisation. The predicament facing the industry thus far has been finding a product that has improved environmental categorisation without compromising the performance.

A group of suitable corrosion inhibitors are glycosides and polyglycosides which are known to be bio-degradable.

In WO-A-86/064217 is a method for inhibiting oxidation or acid attack of ferrous metals utilizing glycosides and cleaning compositions of ferrous metals described.

M. Du et al., Chinese Chemical Letters 15 (2004), 985-988, describe a new-generation of alkylpolyglucosides as inhibitor to the corrosion of 907 steel in seawater. Here, alkylpolyglycol glycosides are used in a mixture with calcium gluconate and zinc sulphate.

Even though there are several corrosion inhibitors based on glycosides and polyglycosides are described a need further exists to provide new and sufficient corrosion inhibitors.

Therefore, an object of the present invention is to provide such corrosion inhibitors.

The underlying problem is solved by a chemical composition useful as corrosion inhibitor comprising
(a) a glycoside component A comprising at least one glycoside of the formula $R(OG)_x$ wherein R is an aliphatic hydrocarbon radical having 1 to 25 carbon atoms or is a radical of formula $R^1(OR^2)_n$ which does have more than 25 carbon atoms and wherein n=0 to 24 and $R^1$ and $R^2$ are aliphatic hydrocarbon radicals; G is the residue of a saccharide moiety selected from the group consisting of fructose, glucose, mannose, galactose, talose, gulose, allose, altrose, idose, arabinose, xylose, lyxose, ribose and alkoxylated derivatives thereof; and x is 1 to 30;
(b) an aspartate component B comprising at least one polymerisation product of aspartic acid, optionally in form of a copolymerisate with fatty acids, polybasic carboxylic acids, anhydrides of polybasic carboxylic acids, polybasic hydroxycarboxylic acids, monobasic polyhydroxycarboxylic acids, alkoxylated alcohols, alkoxylated amines, amino sugars, carbohydrates, sugar carboxylic acids and polymers thereof.

Surprisingly, it was found that a chemical composition comprising components A and B are more effective as corrosion inhibitors compared to the single components A or B.

According to the present invention the chemical composition comprises a glycoside component A comprising at least one glycoside of the formula $R(OG)_x$ wherein R is an aliphatic hydrocarbon radical having 1 to 25 carbon atoms or is a radical of formula $R^1(OR^2)_n$ which does have more than 25 carbon atoms and wherein n=0 to 24 and $R^1$ and $R^2$ are aliphatic hydrocarbon radicals; G is the residue of a saccharide moiety selected from the group consisting of fructose, glucose, mannose, galactose, talose, gulose, allose, altrose, idose, arabinose, xylose, lyxose, ribose and alkoxylated derivatives thereof; and x is 1 to 30.

Component A may comprise one or more glycosides as described above.

In a preferred embodiment the glycoside component A comprises at least one glycoside of the formula $R(OG)_x$ wherein R is an aliphatic hydrocarbon radical having 1 to 25 carbon atoms; G is the residue of a saccharide moiety selected from the group consisting of fructose, glucose, mannose, galactose, talose, gulose, allose, altrose, idose, arabinose, xylose, lyxose, ribose and alkoxylated derivatives thereof; and x is 1 to 30.

Preferably, alkoxylated derivatives are those compounds where one or more hydroxyl groups, preferably other than the glycosidic hydroxyl group are alkoxylated with an alkyl group having 1 to 20 carbon atoms which are straight-chain or branched. More preferred such an alkyl group is methyl.

Furthermore, it is preferred that R is a straight-chain or branched alkyl group having 1 to 25 carbon atoms, more preferred 1 to 20 carbon atoms and even more preferred 8 to 15 carbon atoms. R is preferably attached to the $C_1$-position of the glycoside.

It is also preferred that G is glucose. In a further preferred embodiment x is 1 to 10, more preferred 1 to 5 and even more preferred 1 to 2.

Suitable glycosides and polyglycosides for component A of the chemical composition of the present invention are described in WO-A-86/06417. When the glycosides and polyglycosides are made or purchased they often are mixtures comprising molecules of varying degrees of polymerization.

Furthermore, glycosides and polyglycoside compounds and processes for making them are disclosed in U.S. Pat. Nos. 2,974,134; 3,219,656; 3,598,865; 3,707,535; 3,772,269; 3,839,318; 3,974,138; and 4,223,129. Alkoxylated glycosides, such as those disclosed in U.S. Pat. No. 3,640,098 are also useful.

The chemical composition of the present invention further comprises an aspartate component B comprising at least one polymerisation product of aspartic acid, optionally in form of a copolymerisate with fatty acids, polybasic carboxylic acids, anhydrides of polybasic carboxylic acids, polybasic hydroxycarboxylic acids, monobasic polyhydroxycarboxylic acids, alkoxylated alcohols, alkoxylated amines, amino sugars, carbohydrates, sugar carboxylic acids and polymers thereof.

The aspartate component B can comprise one or more of the aforementioned polymers.

In a preferred embodiment the aspartate component B comprises at least polyaspartic acid.

Polyaspartic acid is known in the art and several methods are described to prepare such a polymer. U.S. Pat. No. 5,830, 985 describes a process for preparing polyaspartic acid by polycondensation of fine-particle aspartic acid at temperatures above 150° C. in the presence of acidic catalysts.

Polyaspartic acid may be used as such or copolymerisation is possible. The copolymerisate may include fatty acids, polybasic carboxylic acids, anhydrides of polybasic carboxylic acids, polybasic hydroxycarboxylic acids, monobasic polyhydroxy carboxylic acids, alkoxylated alcohols, alkoxylated amines, amino sugars, carbohydrates, sugar carboxylic acids and polymers thereof.

It is preferred that the alkoxylated copolymer monomers are alkoxylated with an alkyl chain having 1 to 20 carbon atoms and being straight-chain or branched, preferably the alkoxylation group is a methyl group.

Such copolymers with aspartic acid and monomeric compounds are described in U.S. Pat. No. 5,747,635.

For the preparation of modified polyaspartic acids L-, D- or DL-aspartic acid can be used. DL-Aspartic acid is industrially readily accessible, for example by reaction of ammonia with maleic acid or fumaric acid. Aspartic acid can be prepared by any known method. L-Aspartic acid is prepared by asymmetrical L-aspartase-catalyzed addition of ammonia to fumaric acid. Suitable microbes for the industrial bioconversion of fumaric acid into L-aspartic acid comprise mutated strains of, for example, *Pseudomonas* and *Brevibacterium flavum* or lactoferum in the catalyzed addition of ammonia to fumaric acid, the microorganisms can be immobilized on a solid phase. Accordingly, the production of L-aspartic acid can be carried out economically and continuously in a flow-through reactor or tube; cf. Ullmanns Encyklopadie der technischen Chemie, 1985, Volume A2, page 68. L-Aspartic acid can also be prepared by chemical or enzymatic hydrolysis of L-asparagine. L-Asparagine is obtained as a by-product in sugar beet molasses and in the processing of potatoes. The polycondensates are preferably prepared using L- and DL-aspartic acid. The particularly preferred starting materials for preparing cocondensates of polyaspartic acid are biotechnologically prepared L-aspartic acid and DL-aspartic acid that has been prepared from fumaric acid or maleic acid and ammonia.

The polycocondensates contain from 1 to 99.9, preferably from 70 to 99.9, mol % of aspartic acid as cocondensed units.

The second monomer of the polycondensates can be any fatty acid. It can be saturated or ethylenically unsaturated. Examples of fatty acids are formic acid, acetic acid, propionic acid, buteric acid, valeric acid, lauric acid, palmitic acid, stearic acid, behenic acid, oleic acid, capric acid, linoleic acid, linolenic acid, sorbic acid, myristic acid, undecanoic acid and all the naturally occurring fatty acid mixtures, for example $C_{12}/C_5$ or $C_{16}/C_{18}$ fatty acid mixtures. Suitable ethylenically unsaturated fatty acids also include acrylic acid and methacrylic acid.

Examples of polybasic carboxylic acids are oxalic acid, adipic acid, fumaric acid, maleic acid, itaconic acid, aconitic acid, succinic acid, malonic acid, suberic acid, azeleic acid, pyridinedicarboxylic acid, furandicarboxylic acid, phthalic acid, terephthalic acid, diglycolic acid, glutaric acid, substituted $C_4$-dicarboxylic acids, for example mercaptosuccinic acid, sulfosuccinic acid, $C_1$-$C_{26}$-alkylsuccinic acids (eg. octylsuccinic acid or dodecylsuccinic acid), $C_2$-$C_{26}$-alkenylsuccinic acid (eg. Octenylsuccinic acid or dodecenylsuccinic acid), 1,2,3-propanetricarboxylic acid, 1,1,3,3-propanetetracarboxylic acid, 1,1,2,2-ethanetetracarboxylic acid, 1,2,3,4-butanetetracarboxylic acid, 1,2,2,3-propanetetracarboxylic acid, 1,3,3,5-pentanetetracarboxylic acid, 1,2,4-benzenetricarboxylic acid and 1,2,4,5-benzenetetracarboxylic acid.

If the abovementioned polybasic carboxylic acids can form anhydrides, these anhydrides can also be used in the preparation of the polycocondensates, eg. succinic anhydride, the dianhydride of butanetetracarboxylic acid, phthalic anhydride, acetylcitric anhydride, maleic anhydride, itaconic anhydride and aconitic anhydride.

It is also possible to use polybasic hydroxycarboxylic acids and/or polyhydroxycarboxylic acids. Polybasic hydroxycarboxylic acids have at least two or more carboxylic acids as well as at least one hydroxyl group. Examples are citric acid, isocitric acid, mucic acid, tartaric acid, tartronic acid and malic acid.

Monobasic polyhydroxycarboxylic acids have two or more hydroxyl groups as well as one carboxylic acid group. Examples are glyceric acid, bis(hydroxymethyl)propionic acid, gluconic acid and hydroxylated unsaturated fatty acids such as dihydroxstearic acid.

Furthermore, it is also possible to use monohydric alcohols of, for example, 1 to 22 carbon atoms, eg. methanol, ethanol, n-propanol, isopropanol, butanol, pentanol, hexanol, cyclohexanol, octanol, decanol, dodecanol, palmityl alcohol, stearyl alcohol and behenyl alcohol. These alcohols may also be alkoxylated. Suitable examples are the addition products of from 1 to 200 mol of a $C_2$-$C_4$-alkylene oxide with one mole of the alcohol mentioned. Suitable alkylene oxides are for example ethylene oxide, propylene oxide and butylene oxides. Preference is given to using ethylene oxide, and propylene oxide, or to adding ethylene oxide and propylene oxide or vice versa, to the alcohol. Of industrial interest are in particular the addition products of 3 to 20 mol of ethylene oxide with 1 mol of $C_{13}/C_{15}$ oxo process alcohols or with fatty alcohols. The alcohols may if desired also contain a double bond, such as oleyl alcohol.

It is also possible to use polyols, such as ethylene glycol, glycerol, oligoglycerol, erythritol, pentaerythritol, sorbitol and alkoxylated polyols, such as polyethylene glycols, polypropylene glycols, ethoxylated glycerol and ethoxylated pentaerythritol. The polyalkylene glycols can have molecular weights of up to 5000.

Further suitable compounds are amines, such as $C_1$-$C_{22}$-alkylamines, eg. methylamine, trimethylamine, ethylamine, diethylamine, triethylamine, cyclohexylamine, octylamine and stearylamine, palmitylamine, ethylenediamine, diethylenetriamine, triethylenetetramine, hexamethylenediamine, diamonobutane, oleylamine, hydroxylamine, hydrazine, N-(carboxymethyl)hydroxylamine, N,N-di(carboxymethyl)hydroxylamine, tricarboxymethylhydroxylamine, tetracarboxymethylhydrazine, ethanolamine, diethanolamine and triethanolamine, and also polyalkyleneamines, such as polyethyleneimine having molecular weights of up to 5000.

It is also possible to use alkoxylated amines, for example the addition products of from 5 to 30 mol of ethylene oxide with 1 mol of stearylamine, oleylamine or palmitylamine.

It is also possible to use naturally occurring amino sugars, such as chitosamine or chitosan, and also compounds obtained from reducing carbohydrates by reductive amination, such as aminosorbitol.

It is also possible to use carbohydrates such as glucose, sucrose, dextrins, starch and degraded starch, maltose and sugarcarboxylic acids, eg. mucic acid, gluconic acid, glucaric acid, gluconolactone, gulonolactone and glucuronic acid.

The comonomer can also be a proteinogenic or nonproteinogenic amino acid. A nonproteinogenic amino acid is any amino- and carboxyl-containing monomer component whose structure is not identical with that of any of the amino acids which are the normal building blocks of animal and vegetable proteins and whose incorporation into proteins is governed by the genetic code; cf. Jakubke and Jeschkeit, Aminosauren, Peptide, Proteine, Verlag Chemie, Weinheim 1982, pages 26-29.

Examples of nonproteinogenic amino acids are anthranilic acid, N-methylamino acids such as N-methylglycine, dimethylaminoacetic acid, ethanolaminoacetic acid, N-carboxymethylamino acids such as iminodiacetic acid, isoserinediacetic acid, nitrilotriacetic acid, ethylenediaminediacetic acid, ethylenediaminetetraacetic acid, diethylenetriaminepentaacetic acid, hydroxyethylethylenediaminetriacetic acid, also alpha.- and beta.-aminotricarballylic acid, diaminosuccinic acid, $C_4$-$C_{26}$-aminoalkylcarboxylic acids such as 4-aminobuteric acid, 11-aminoundecanoic acid, 6-aminocaproic acid and also caprolactam.

The polycocondensation can also be carried out with salts and addition compounds of diamines and dicarboxylic acids. For instance, it is possible to prepare a polyamide-modified polyaspartic acid containing 80 mol % of aspartic acid, 10 mol % of adipic acid and 10 mol % of hexamethylenediamine.

The comonomer can be used in the polycocondensation in an amount of from 0.1 to 99, preferably from 0.5 to 30, mol %. It can be a single compound or a mixture of 2 or more compounds.

The polycocondensation of aspartic acid with the comonomer can be carried out at from 100° to 270° C., preferably at from 120° to 250° C. The heating is preferably carried out under reduced pressure or in an inert gas atmosphere. However, the condensation reaction can also be carried out under superatmospheric pressure or in a gas stream, for example in carbon dioxide, air, nitrogen or superheated steam. The condensation time depends on the choice of reaction conditions. In general it will be within the range from 1 minute to 50 hours. In industry the polycocondensates can be prepared for example using a heatable drying belt, a paddle dryer, a drum dryer, a tumble dryer or a fluidized bed dryer. Polycocondensates having a low molecular weight can also be prepared in a pressuretightly sealed vessel by removing only some if any of the water formed in the course of the polycondensation. The polycocondensation can also be carried out using infrared radiation or microwave radiation. Under otherwise unchanged reaction conditions the addition of the comonomer reduces the molecular weight of the polycondensates compared with the pure polyaspartic acid homocondensates.

The polycocondensation of aspartic acid with other carboxylic acids can also start from the salts of aspartic acid or the salts of the other carboxylic acids if inorganic acids are additionally present. Suitable salts of aspartic acid and of polybasic carboxylic acids, of the fatty acids, of acrylic acid or of methacrylic acid are for example the ammonium, alkali metal or alkaline earth metal salts. If the polycocondensation is carried out in the presence of inorganic acids, the temperature required for the condensation can be reduced compared with the purely thermal polycondensation of aspartic acid with the comonomer. If salts of aspartic acid and inorganic acids are used, the condensation temperatures range from 100° to 270° C. and are preferably within the range from 120° to 250° C., while the reaction time ranges from about 1 minute up to 10 hours.

The polycondensation can be carried out for example in solid phase by first preparing an aqueous solution of aspartic and at least one of the compounds suitable comonomer and evaporating the solution to dryness. Condensation may already occur under these conditions. However, it is also possible to carry out the evaporation under mild conditions, in which case, if a carboxylic acid is used as the comonomer, the product is a solid salt of aspartic acid with a carboxylic acid, which is subjected to a subsequent condensation. A solid phase condensation can be advantageous because it can be carried out in customary solids handling apparatus, namely tumble dryers, drying belts or fluidized bed dryers. It is possible for example first to prepare the salts defined hereinafter and then to subject them to a polycocondensation in solid phase. The salts are prepared for example by mixing aspartic acid with sulfosuccinic acid, malic acid, tartaric acid, citric acid, isocitric acid, mucic acid, glyceric acid, maleic acid, fumaric acid, aconitic acid, itaconic acid or butanetetracarboxylic acid. However, to prepare the salt for subsequent condensation it is also possible to mix aspartic acid with a mixture of citric acid and tartaric acid. Further mixtures of this kind are possible by using for example as comonomer mixtures of butanetetracarboxylic acid and tartaric acid, butanetetracarboxylic acid and citric acid, butanetetracarboxylic acid and malic acid, butanetetracarboxylic acid and sorbitol, and maleic acid and acrylic acid.

For the preparation of polyaspartate or a copolymer thereof also maleic acid anhydride or a derivative (educt A) can be thermally condensed in the presence of ammonia or any source of ammonia. For example ammonium salts or amides of carbon dioxide that generate ammonia (educt B) can be used as ammonia source. If desired an additional comonomer (educt C) can be added. These components A and B (and if desired C) react in a first exothermic step to give a nitrogen-containing low molecular weight derivative of maleic acid. Heating to elevated temperature initiates the second step that polymerizes the reaction mixture to give a polymer with succinyl repeating units. Suitable reaction temperatures range from 100° C. to 270° C., while reaction times range from 1 minute up to 10 hours.

The introduction of ethylenically unsaturated double bonds into polyaspartic acid to prepare a modified polyaspartic acid with unsaturation as modifying feature is accomplished by polycocondensation of aspartic acid with unsaturated carboxylic acids or anhydrides thereof, for example with maleic acid, maleic anhydride, fumaric acid, aconitic acid and itaconic acid, in the presence of phosphoric acid. The polycocondensates are stripped of monomeric constituents by extraction with water and 1N hydrochloric acid. Spectroscopic analysis by $^{13}$C-NMR (solvent: deuterated dimethyl sulfoxide) shows signals at 135 ppm. They prove that unsaturated carboxylic acids have been incorporated into the polycondensate. They can be present as end groups in the form of cyclic maleimide units or open-chain maleamic or fumaramic acid units or in the peptide chain in the form of maleamide or fumaramide units. The double bonds are thus present in the terminal (end group) position or distributed over the polycondensate backbone.

Polycocondensates of unsaturated carboxylic acids can likewise be produced by condensing aspartic acid together with hydroxypolycarboxylic acids. For example, cocondensates produced in the presence of phosphoric acid with malic acid likewise have signals at 135 ppm (maleimide, maleamic, maleamide units) and those with citric acid at 123 ppm and 140 ppm. Under these polycondensation conditions the polycondensation is accompanied by a dehydration of the hydroxypolycarboxylic acids.

If the polycocondensation is carried out using for example 10 mol % of unsaturated carboxylic acids or hydroxycarboxylic acids, then the proportion of unsaturated carboxylic acid in the polycocondensates is 3-6 mol %. If higher proportions of carboxylic acid are used in the cocondensation, then the proportion of unsaturated carboxylic acid in the polycondensates is more than 6 mol %.

The polycocondensation can be carried out for example using as inorganic acid any hydrohalic acid. Hydrochloric acid is preferred. The hydrohalic acid used can be in the gaseous or liquid state. Preference is given to using concentrated aqueous solutions of hydrochloric acid, in which aspartic acid is soluble to form aspartic acid hydrochloride. However, the hydrochloride can also be prepared using liquid or gaseous hydrogen chloride. The aqueous solutions with aspartic acid hydrochloride and at least one comonomer in solution are evaporated to dryness. The residue is polycondensed by heating to temperatures within the above-specified range. The continuous evaporation of the aqueous solutions can be effected using for example a spray dryer or a spray fluidized bed dryer. The polycondensation of hydrochlorides can be carried out immediately after the evaporating or else at a later date. Suitable apparatus for the condensation is any apparatus in which solids can be heated as high as 270° C. under reduced pressure or in a gas stream. In the course of the polycondensation the hydrogen chloride re-emerges from the condensation product and can be recovered and reacted again with aspartic acid.

The polycondensation with the other compounds which come into consideration can also be carried out with inorganic acids of phosphorus in various oxidation states. The inorganic acid of phosphorus used is preferably phosphoric acid or a polymeric anhydride of phosphoric acid (a polyphosphoric acid). The phosphoric acid used is preferably technical-grade aqueous orthophosphoric acid from 75 to 85% in strength.

However, it is also possible to use 100% strength orthophosphoric acid or metaphosphoric acid. Examples of suitable polymeric anhydrides of polyphosphoric acid are diphosphoric acid, (pyrophosphoric acid), triphosphoric acid and higher homologs. The polycondensation can also be carried out with an excess of acids containing bound phosphorus. This measure can be of advantage in those cases where high molecular weight polycocondensates of aspartic acid form very viscous solutions in phosphoric acids. In these cases superstoichiometric amounts of phosphoric acid can act as solvents/diluents and reduce the viscosity of the resulting polymer solutions.

The reaction with phosphoric acid is carried out by suspending aspartic acid and at least one comonomer in phosphoric acid at 200° C. and heating the suspension to about 140° C., preferably under reduced pressure. Any water introduced with the phosphoric acid will distil off, while at the same time the aspartic acid and the comonomer will dissolve in the phosphoric acid. The result obtained is a homogeneous melt, which is thermally polycondensed by heating to 120°-270° C., preferably under reduced pressure. As the polycondensation proceeds, the reaction mixture becomes more and more viscous. The rate of increase in the viscosity of the reaction mixture can be used to monitor the rate of increase in the molecular weight. The polycondensation reaction can be discontinued before it has ended to limit the molecular weight of the condensates. The comonomer has an appreciable influence on the viscosity of the reaction mixture. It is possible for example to carry out a polycocondensation of 1 mol of aspartic acid, 0.1 mol of butanetetracarboxylic acid and 1 mol of phosphoric acid in a reactor equipped with a stirrer.

Further methods for producing copolymerisates of aspartic acid and the comonomers described above are given in U.S. Pat. No. 5,747,653, EP-A 0 650 995 and U.S. Pat. No. 5,478,919.

Further copolymerisates of aspartic acid with maleic anhydride an ammonia and/or primary or secondary amines are described in U.S. Pat. No. 5,548,036.

It is also possible to use polymers as comonomers for the polymerization with aspartic acid in order to obtain a polymerization product useful for the aspartate component B of the chemical composition of the present invention.

Suitable polymers containing carboxylic groups, which contain at least 10 mol.-% of a monoethylenically unsaturated carboxylic acid are described in U.S. Pat. No. 5,574,113.

Suitable comonomers are polymers containing carboxyl groups, which contain at least 10 mol % of a monoethylenically unsaturated carboxylic acid in copolymerized form and have a molecular weight of at least 300. These polymers can be homopolymers of monoethylenically unsaturated carboxylic acids or copolymers of these carboxylic acids with other monoethylenically unsaturated monomers copolymerizable therewith or copolymers of at least 2 monoethylenically unsaturated carboxylic acids or anhydrides. Suitable monoethylenically unsaturated carboxylic acids preferably contain 3 to 8 carbon atoms in the molecule, eg. acrylic acid, methacrylic acid, maleic acid, maleic anhydride, fumaric acid, crotonic acid, citraconic acid, aconitic acid, methylenemalonic acid, methylenesuccinic acid, ethylacrylic acid and itaconicic acid. Preferred polymers containing carboxyl groups are, for example, homopolymers of maleic acid, acrylic acid and methacrylic acid and also copolymers of acrylic acid and methacrylic acid in any desired ratio and copolymers of acrylic acid and maleic acid, e.g. in the molar ratio from 10:90 to 90:10. The molecular weight of the homo- and copolymers which are employed as comonomer is preferably from 300 to 250,000 and is preferably in the range from 350 to 100,000. The homo- and copolymers of the monoethylenically unsaturated carboxylic acids can be prepared according to all known processes by polymerizing the monomers in aqueous medium or in an organic solvent in the presence of radical-forming initiators. In principle, all known processes for substance, solution, emulsion and precipitation polymerization are suitable for preparing the polymers. Preferably, polymers prepared by solution polymerization processes in water at temperatures from 50° to 180° C. in the presence of radical-forming initiators or polymers prepared by substance polymerization at from 180° to 350° C. are employed as comonomer. Thus, for example, copolymers of acrylic acid and maleic anhydride having molecular weights from 300 to 30,000 are obtained by adding acrylic acid and maleic anhydride continuously to a high-temperature reactor at from 200° to 350° C. and polymerizing therein. The polymerization can in this case be carried out in the absence or alternatively in the presence of initiators which form radicals under the polymerization conditions. As a result of the effect of water on the copolymers, the anhydride groups hydrolyze to free carboxyl groups.

Copolymers of acrylic acid and methacrylic acid are preferably prepared by solution polymerization in water according to the process known from EP-B-0 075 820 or alternatively by polymerizing in organic solvents in the presence of radical polymerization initiators.

Dimerized or oligomerized unsaturated fatty acids can also be used, which are obtainable, for example, by cycloaddition of mono- or polyunsaturated fatty acids.

If desired, the monoethylenically unsaturated carboxylic acids can be copolymerized in the presence of other monoethylenically unsaturated monomers which are copolymerizable therewith. The other monomers which are copolymerized with the monoethylenically unsaturated carboxylic acids are, if they are additionally used in the copolymerization, contained in copolymerized form in amounts from 5 to 95, preferably 10 to 90% by weight. The copolymers should contain at least 10 mol % of the ethylenically unsaturated carboxylic acids in copolymerized form. Suitable other monomers which are copolymerizable with the monoethylenically unsaturated carboxylic acids are, for example, vinyl ethers, vinyl esters, alkyl acrylates, alkyl methacrylates, styrene, N-vinylpyrrolidone, acrylamide, methacrylamide, acrylonitrile, methacrylonitrile, allyl alcohol and allyl alcohol ethoxylates, furans and olefins having 2 to 30 C atoms. Other suitable monomers are polyalkylene glycol monovinyl ethers, polyethylene glycol $C_1$-$C_{22}$-alkylvinyl ethers, N-vinylformamide and N-vinylacetamide. Copolymers which contain vinyl esters, N-vinylformamide or N-vinylacetamide in copolymerized form can be converted by hydrolysis into polymers containing vinyl alcohol and vinylamine units.

Examples of suitable copolymers of monoethylenically unsaturated carboxylic acids or their anhydrides with other monoethylenically unsaturated compounds are:

copolymers of vinyl acetate and maleic acid,
copolymers of vinyl acetate and acrylic acid or methacrylic acid,
terpolymers of vinyl acetate, maleic acid and acrylic acid or methacrylic acid,
polymers of vinyl acetate, acrylic acid and/or maleic acid, the vinyl acetate units being contained in partially or completely hydrolyzed form as vinyl alcohol units,
copolymers of methacrylic acid and methyl methacrylate,
copolymers of butyl acrylate and acrylic acid,
copolymers of styrene and maleic anhydride,
polyoleic acid,
polylauric acid, graft polymers of acrylic acid and/or maleic acid to polyethylene glycols and/or polypropylene glycols,
polycondensates of terephthalic acid and polyalkylene oxides with acid end groups,
copolymers of vinylsulfonic acid and maleic acid,
terpolymers of isobutene, maleic acid and acrylic acid,
copolymers of acrylamide and acrylic acid,
copolymers of acrylamide and maleic anhydride,
terpolymers of acrylamide with acrylic acid and maleic anhydride,
copolymers of N-vinylpyrrolidone and maleic acid and/or acrylic acid,
copolymers of N-vinylformamide and maleic anhydride,
copolymers of N-vinylformamide and acrylic acid,
terpolymers of N-vinylformamide and acrylic acid and maleic acid,
copolymers of vinylamine and acrylic acid,
copolymers of vinylamine and maleic acid,
terpolymers of vinylamine, acrylic acid and maleic acid,
terpolymers of diisobutene, maleic acid and acrylic acid,
copolymers of isobutylene and maleic anhydride,
copolymers of octadecene and maleic anhydride,
polyethylene waxes grafted with maleic anhydride,
copolymers of vinylphosphonic acid and maleic acid,
copolymers of methyl vinyl ethers with maleic anhydride,
copolymers of 1,4-butanediol monovinyl ether ethoxylates diethyl maleate and/or acrylic acid and/or butyl acrylate and also copolymers of diethylene glycol ethyl vinyl ether, maleic anhydride and/or acrylic acid.

The copolymers containing maleic anhydride in copolymerized form can be partially hydrolyzed prior to the reaction with aspartic acid so that the copolymers contain, for example, 10 mol % of maleic acid units. The molecular weight of the copolymers specified above is from 300 to 250,000. The homo- and copolymers described above exhibit a molecular weight distribution. The measurement specified for the distribution is customarily the ratio Mw/Mn, whose numerical value for these homo- and copolymers is greater than 1 and customarily in the range from 1.01 to 50.

The polycocondensates based on aspartic acid are prepared, for example, by subjecting aspartic acid and the polymers jointly to polycondensation or by first polycondensing aspartic acid to give polyaspartic acid or polyaspartimide and, after addition of the comonomer, carrying out the polycocondensation. All polycondensation techniques can be used for this purpose. Examples are solution, solid phase or melt polycondensation.

In a preferred embodiment of the present invention the chemical composition includes a component A and a component B, wherein the ratio wt-% component A:wt-% component B is in the range of from 10:1 to 1:10, more preferred 5:1 to 1:5 and even more preferred 2:1 to 1:2.

The chemical composition of the present invention may comprise further components and additives.

In a preferred embodiment the chemical composition of the present invention further comprises
(c) an alcohol component C comprising at least one straight-chain or branched alkyl alcohol having 1 to 8 carbon atoms and 1 to 4 hydroxy groups optionally being at least partially alkoxylated, wherein the alkyl chain is optionally interrupted with 1 to 3 oxygen atoms.

It is preferred that in case the alcohol is alkoxylated the alkoxy group is an alkyl group having 1 to 20 carbon atoms and being straight-chain or branched.

Suitable alcohols are those described above as comonomer for the polymerisation with aspartic acid.

It is even more preferred that the alcohol component C comprises an alkoxylated glycol, like dibutylglycol.

The chemical composition of the present invention may comprise additives like defoamers.

Therefore another object of the invention is a chemical composition of the present invention further comprising at least one defoamer. Suitable defoamers are well known in the art a can be used for said chemical composition.

Furthermore, the chemical composition of the present invention may comprise corrosion inhibitors other than described herein.

Furthermore, the chemical composition of the present invention may be combined with other chemicals needed for the desired application, e.g. scale inhibitors, demulsifiers, chelates, etc. during the process of oil production.

The chemical composition of the present invention may also comprise a solvent. Suitable solvents are acetone, acetonitrile, aniline, anisole, benzene, benzonitrile, bromobenzene, butanol, tert.-butanol, chinoline, chlorbenzene, chloroform, cyclohexane, diethylenglycol, diethylether, dimethylacetamide, dimethylformamide, dimethylsulfoxide, dioxane, acetic acid, acetic acid anhydride, acetic acid ethyl ester, ethanol, ethylene dichloride, ethylene glycol, ethyleneglycoldimethylether, formamide, hexane, isopropanol, methanol, 3-methyl-1-butenol, methylenechloride, ethylketone, N-methylformamide, nitrobenzene, nitromethane, piperidine, propenol, propylencarbonate, pyridine, tetrahydrofurane, toluene, triethylamine, triethylenglycol, triglyme, water and mixtures thereof. Preferred are water and with water miscible solvents and mixtures thereof. Even more preferred is water.

In case some of the solvents mentioned above may be suitable as component C these have to be treated as part of component C and not as solvent.

Another aspect of the present invention is the use of a chemical composition according to the present invention as corrosion inhibitor, especially in the oil industry, gas industry, in heating and cooling circuits and for the water treatment.

EXAMPLES

Example 1

Two formulations representing a chemical composition of the present invention are prepared. A mixture of Lutensol® GD 70, a 70 wt.-% aqueous solution of an alkyl polyglycoside is used as component A, polyaspartic acid is used as component B and dibutylglycol is used as component C. The Reference formulation is state of the art described M. Du et al., Chinese Chemical Letters 15 (2004), 985-988.

Further details are given in the table below:

| Component | Formulation 1 (wt.-%) | Formulation 2 (wt.-%) | Reference (wt.-%) |
|---|---|---|---|
| A | 36.5 | 21.9 | 40 |
| B | 18.7 | 25.3 | — |
| C | 8.6 | 5.1 | — |
| Defoamer | 0.9 | 0.9 | — |
| Zinc Sulphate | — | — | 40 |
| Calcium Gluconate | — | — | 20 |
| Water | 35.3 | 46.8 | — |

Example 2

Corrosion tests are carried out using various North Sea produced waters. The chemical analysis for the produced water used herein are shown below:

| ION | mg/l | Equiv. Wt. | meq/l |
| --- | --- | --- | --- |
| Na | 55810.00 | 23.00 | 2426.52 |
| K | 2470.00 | 40.00 | 61.75 |
| Ca | 10170.00 | 20.00 | 508.50 |
| Mg | 755.00 | 12.20 | 61.89 |
| Sr | 290.00 | 43.80 | 6.62 |
| Ba | 22.00 | 68.70 | 0.32 |
| Fe | 0.00 | 27.90 | 0.00 |
| Cl | 102410 | 35.50 | 0.00 |
| $HCO_3$ | 0.00 | 61.00 | 0.00 |
| $SO_4$ | 0.00 | 48.00 | 0.00 |
| Li | 49.00 | | |
| Boron | 0 | | |
| pH | 7.00 | | |

| SALT | Equiv. Wt. | g/l | g/5 l | g/25 l |
| --- | --- | --- | --- | --- |
| NaCl | 58.46 | 141.85 | 709.27 | 3546.36 |
| KCl | 75.50 | 4.66 | 23.31 | 116.55 |
| $CaCl_2 2H_2O$ | 73.50 | 37.37 | 186.87 | 934.37 |
| OR | | | | |
| $CaCl_2$ | 55.50 | | | |
| $MgCl_2 6H_2O$ | 101.50 | 6.28 | 31.41 | 157.03 |
| $SrCl_2 6H_2O$ | 133.30 | 0.88 | 4.41 | 22.06 |
| $BaCl_2 6H_2O$ | 122.20 | 0.04 | 0.20 | 0.98 |
| $FeCl_2$ | 63.40 | 0.00 | 0.00 | 0.00 |
| $NaHCO_3$ | 84.00 | 0.00 | 0.00 | 0.00 |
| $Na_2SO_4$ | 71.00 | 0.00 | 0.00 | 0.00 |
| LiCl | | 0.3 | 1.5 | 7.5 |

Similar tests were performed on other water chemistries, including Norwegian brines with the same high levels of inhibition achieved.

The two formulations are tested using the techniques of bubble test and rotating cylinder electrode (RCE). All tests are carried out at a temperature of 75° C. All corrosion tests are conducted using mild steel electrodes machined from steel grade AISI 1018 having the following composition: 0.18% C, 0.81% Mn, 0.003% P, 0.029% S, 0.08% Cr, 0.11% Ni, 0.0018 Mo, 0.26% Cu; with Fe as balance.

Example 3

Bubble Test Method

The bubble test method involves evaluating the corrosion of a given metal in simulated brine saturated with carbon dioxide at a temperature equivalent to that in the field. During the test, carbon dioxide gas is continuously sparged into the test solution, hence the name "bubble test". The rate of corrosion is determined instantaneously using the linear polarisation resistance (LPR) technique, which involves the application of a small DC voltage to a pair of identical electrodes and measuring the resultant current. An ACM Gill 12 multichannel potentiostat, interfaced to a computer was used for this test as well as subsequent test methods described in this report. Details of the bubble test procedure are given below:

The Method was adopted from ASTM Standards: Designations G59[1] and G3[2]

[1] G59 Test Method for Conducting Potentiodynamic Polarisation Resistance Measurements, Annual Book of ASTM Standards, Vol. 03.02 (2001)
[2] G3 Practice for Conventions Applicable to Electrochemical Measurements in Corrosion Testing, Annual Book of ASTM Standards, Vol. 03.02 (2001)

1. Synthetic brine was prepared based on the water chemistry of the field.
2. 1000 mls of the test solution was transferred into glass cells.
3. The cells were placed in a water bath set at 75° C.
4. The solutions were sparged with carbon dioxide for one hour to remove oxygen and to ensure that the solution was saturated with carbon dioxide prior to inserting the corrosion probes.
5. The electrodes were pre-treated as follows:
   (a) Degreasing by dipping in xylene for 30 seconds,
   (b) drying in air,
   (c) pickling in 15% HCl for 30 seconds to remove any mill scales,
   (d) rinsing thoroughly in de-ionised water to remove the acid,
   (e) dipping in reagent grade acetone for 10 seconds to dry the electrodes,
   (f) drying in air.
6. The electrodes were lowered into the test cells and allowed to pre-corrode for at least two hours, while continuously sparging carbon dioxide and monitoring the corrosion rate.
7. The required dosage of the corrosion inhibitor was injected under the brine surface using a micropipette.
8. Corrosion rate data were collected at 15-minute intervals for 20 hours, from which the percentage protection was calculated. Calculation of percentage protection was not based on the blank corrosion rate; it was rather based on the corrosion rate for given cell before and after inhibitor addition.

The results are shown in table 1. Prior to dosing the corrosion inhibitor, the mild steel electrodes were allowed to pre-corrode for about 5 hours.

TABLE 1

| | Data from LPR charts | | | | | |
| --- | --- | --- | --- | --- | --- | --- |
| Time [hours] | Lutensol ® GD70 @ 20 ppm active | Polyaspartate @ 20 ppm | Formulation 1 @ 20 ppm | Formulation 1 @ 50 ppm | Formulation 1 @ 100 ppm | Formulation 1 @ 150 ppm |
| 0 | 81.6 | 70.3 | 77.3 | 70.5 | 81.6 | 62.2 |
| 1 | 75.7 | 69.5 | 75.7 | 71.5 | 81.9 | 72.3 |
| 2 | 78.3 | 68.7 | 74.9 | 78.3 | 81.6 | 81.9 |
| 3 | 77.6 | 70.1 | 68.6 | 75.8 | 76.6 | 83.9 |
| 4 | 75.5 | 70.4 | 64.8 | 68.4 | 73.4 | 85.2 |
| 5 | 67.4 | 56.6 | 47.1 | 44.2 | 42.6 | 50.2 |
| 6 | 50.5 | 42.9 | 38.4 | 33.6 | 28.8 | 35.9 |
| 7 | 43.8 | 39.8 | 33.3 | 27.3 | 19.7 | 23.8 |
| 8 | 39.4 | 35.7 | 27.8 | 21.6 | 15.9 | 17.6 |
| 9 | 35.6 | 33.0 | 24.3 | 18.3 | 13.8 | 14.0 |
| 10 | 33.8 | 30.6 | 22.0 | 16.2 | 12.5 | 12.2 |
| 11 | 32.0 | 29.1 | 19.1 | 14.8 | 12.0 | 11.0 |
| 12 | 29.7 | 26.9 | 17.6 | 13.1 | 11.4 | 10.3 |

TABLE 1-continued

Data from LPR charts

| Time [hours] | Lutensol ® GD70 @ 20 ppm active | Polyaspartate @ 20 ppm | Formulation 1 @ 20 ppm | Formulation 1 @ 50 ppm | Formulation 1 @ 100 ppm | Formulation 1 @ 150 ppm |
|---|---|---|---|---|---|---|
| 13 | 26.9 | 25.8 | 16.6 | 12.5 | 10.8 | 9.4 |
| 14 | 24.6 | 24.7 | 15.3 | 11.9 | 10.1 | 8.8 |
| 15 | 22.2 | 24.2 | 14.8 | 11.2 | 9.6 | 8.2 |
| 16 | 20.4 | 22.9 | 13.9 | 10.9 | 9.2 | 7.7 |
| 17 | 18.5 | 22.4 | 13.1 | 10.2 | 8.9 | 7.8 |
| 18 | 16.8 | 21.2 | 13.0 | 9.7 | 8.2 | 6.8 |
| 19 | 15.3 | 20.5 | 12.5 | 9.7 | 8.7 | 7.1 |
| 20 | 13.3 | 20.2 | 11.7 | 9.2 | 8.3 | 7.0 |
| 21 | 12.6 | 20.8 | | | | |
| 22 | 12.2 | 19.7 | | | | |

Following the addition of the corrosion inhibitors after 5 hours of pre-corrosion following effects can be observed: Both Lutensol® GD70 and Polyaspartate show a certain level of protection. In comparison to that the addition of the mixture of both components, the Formulation 1, exhibits a significantly improved decrease in corrosion rate when added to the North Sea brine. Additionally the final corrosion rate of formulation 1 after 20 hours is reduced compared to Lutensol® GD70 and Polyaspartate alone at the same dosage level.

TABLE 2

Data from LPR charts using of 10 ppm Formulation 1, 500 ppm Formulation 1 and 500 ppm Reference formulation in seawater saturated with $CO_2$ at room temperature.

| Time [hours] | Reference @ 500 ppm | Formulation 1 @ 500 ppm | Formulation 1 @ 10 ppm |
|---|---|---|---|
| 0 | 36.4 | 32.8 | 33.6 |
| 1 | 36.1 | 31.9 | 32.2 |
| 2 | 37.0 | 32.3 | 32.2 |
| 3 | 38.8 | 33.2 | 33.3 |
| 4 | 45.5 | 10.3 | 19.3 |
| 5 | 43.9 | 5.0 | 15.9 |
| 6 | 44.1 | 3.3 | 12.8 |
| 7 | 45.1 | 2.4 | 9.4 |
| 8 | 45.4 | 1.9 | 7.3 |
| 9 | 46.1 | 1.6 | 6.2 |
| 10 | 46.0 | 1.4 | 5.4 |
| 11 | 46.2 | 1.3 | 4.9 |
| 12 | 46.3 | 1.2 | 4.5 |
| 13 | 46.2 | 1.0 | 4.3 |
| 14 | 45.7 | 0.9 | 4.1 |
| 15 | 45.8 | 0.9 | 3.9 |
| 16 | 45.5 | 0.9 | 3.8 |
| 17 | 44.9 | 0.8 | 3.5 |
| 18 | 44.1 | 0.8 | 3.6 |
| 19 | 43.9 | 0.8 | 3.4 |
| 20 | 43.8 | 0.9 | 3.4 |

TABLE 3

Data from LPR charts comparing the effect of inhibitors the Reference formulation and Formulation 1 dosed at 500 ppm with CO2 in seawater.

| | | Reference | Formulation 1 |
|---|---|---|---|
| Seawater at 65° C. | Dose (ppm) | 500 | 500 |
| | Corrosion Rate Prior to Inhibitor Dosing (mpy) | 36 | 33 |
| | Final Corrosion Rate (mpy) | 44 | 0.7 |
| | Difference in Corrosion Rates (mpy) | −8 | 32.3 |
| | Protection (%) | N/a | 98% |

As it can be seen from Table 2 and Table 3 the Formulation 1 provides far greater protection against corrosion, even when dosed as low as 10 ppm. The Reference is not effective and actually increases the corrosion rate.

Table 4 shows the final corrosion rates achieved with Formulation 1 and Formulation 2 after 20 hours in saturated $CO_2$ North Sea brine. This chart shows the greater levels of protection achieved by Formulation 1 compared to Formulation 2. Formulation 1 is notably more efficient, particularly at lower doses. The final corrosion rate decreased with increased dose, as one would expect.

TABLE 4

Comparison of Formulation 1 (Form. 1) and Formulation 2 (Form. 2) from 20-150 ppm final corrosion rates after 20 hours under LPR conditions.

| Dosage | Final corrosion rate [mpy] @ 20 ppm | Final corrosion rate [mpy] @ 50 ppm | Final corrosion rate [mpy] @ 100 ppm | Final corrosion rate [mpy] @ 150 ppm |
|---|---|---|---|---|
| Formulation 1 | 11.5 | 8.9 | 8.2 | 6.7 |
| Formulation 2 | 20.5 | 11.0 | 8.8 | 8.4 |

Example 4

Rotating Cylinder Electrode (RCE) Method

The RCE method is useful in evaluating the film persistency of a given corrosion inhibitor under high shear stress that is common in multiphase flow conditions. Above average North Sea shear stress values were used, 12 Pa, equivalent to a linear velocity of 2.1 m/s. This corresponds to a rotation rate of 2000 rpm for an RCE with an electrode diameter of 1 cm. Corrosion tests are carried out in carbon dioxide saturated brine at 75° C., using the LPR technique. Details of the RCE test method are given below:

The method was adopted from ASTM Standards: Designations G170[3], G59[4] and G3[5]

[3]G170 Standard Guide for Evaluating and Qualifying Oilfield and Refinery Corrosion Inhibitors in the Laboratory, Annual Book of ASTM Standards, Vol. 03.02 (2001)
[4]G59 Test Method for Conducting Potentiodynamic Polarisation Resistance Measurements, Annual Book of ASTM Standards, Vol. 03.02 (2001)
[5]Practice for Conventions Applicable to Electrochemical Measurements in Corrosion Testing, Annual Book of ASTM Standards, Vol. 03.02. (2001)

1. Synthetic brine was prepared based on the water chemistry of the field.
2. 1500 mls of the test solution was transferred into a jacketed RCE cell. The temperature of the solution was maintained at 75° C. by circulating a hating fluid from a temperature regulated heater-chiller bath.
3. The solution was sparged with carbon dioxide for one hour to remove oxygen and to ensure that the solution was saturated with carbon dioxide prior to inserting the corrosion probes.
4. The electrode was pre-treated as follows:
   (a) Degreasing by dipping in xylene for 30 seconds,
   (b) drying in air,
   (c) pickling in 15% HCl for 30 seconds to remove any mill scales,
   (d) rinsing thoroughly in de-ionised,
   (e) dipping in reagent grade acetone for 10 seconds to dry the electrodes,
   (f) drying in air.
5. The electrode was coupled to the RCE shaft lowered into the test cell. The platinum auxiliary electrode and Saturated Calomel Reference Electrode (SCE) were inserted into the cell. The working electrode was rotated at a speed of 2000 rpm and allowed to pre-corrode for at least two hours, while continuously sparging carbon dioxide and monitoring the corrosion rate.
6. The required dosage of the corrosion inhibitor was injected under the brine surface using a micropipette.
7. Corrosion rate data were collected at 15-minute intervals for up to 25 hours, from which the percentage protection was calculated. Calculation of percentage protection was not based on the blank corrosion rate; it was rather based on the corrosion rate for a given cell before and after inhibitor rate.

Table 5 shows the corrosion rate versus time for Formulation 1 at 50 ppm under 12 Pa shear stress value.

TABLE 5

Effect of dosing 50 ppm of Formulation 1 on the corrosion rate of mild steel Rotating Cylinder Electrode rotating at a shear stress of 12 Pa in North Sea brine saturated with $CO_2$ at 75° C.

| Time [hours] | Formulation 1 @ 50 ppm |
| --- | --- |
| 0 | 64.1 |
| 1 | 71.2 |
| 2 | 70.9 |
| 3 | 70.8 |
| 4 | 71.1 |
| 5 | 71.0 |
| 6 | 19.3 |
| 7 | 14.1 |
| 8 | 11.3 |
| 9 | 10.5 |
| 10 | 10.2 |
| 11 | 9.5 |
| 12 | 9.1 |
| 13 | 8.7 |
| 14 | 8.4 |
| 15 | 8.0 |
| 16 | 7.7 |
| 17 | 7.7 |
| 18 | 7.4 |
| 19 | 7.3 |
| 20 | 7.1 |
| 21 | 6.9 |
| 22 | 6.6 |
| 23 | 6.6 |
| 24 | 6.4 |
| 25 | 6.1 |

It can be determined from Table 5 that the corrosion rate was reduced from 71 mpy to 6 mpy, corresponding to 92% corrosion protection. It is worth noting that the corrosion rate remained consistently low following the addition of Formulation 1, indicating that persistency of the corrosion inhibitor film over the electrode surface. The level of corrosion protection in this case is similar to that observed in the Bubble test (Example 3) at the same inhibitor dosage, again confirming the film persistency of Formulation 1 even under shear stress.

The invention claimed is:

1. A method for inhibiting corrosion, comprising:
   adding to an aqueous system a composition, comprising:
   (a) a glycoside component A comprising at least one glycoside of the formula:

$R(OG)_x$ wherein
   R is an aliphatic hydrocarbon radical having 1 to 25 carbon atoms or is a radical of formula $R^1(OR^2)n$ which does not have more than 25 carbon atoms and wherein n =0 to 24 and $R^1$ and $R^2$ are aliphatic hydrocarbon radicals;
   G is a saccharide selected from the group consisting of fructose, glucose, mannose, galactose, talose, gulose, allose, altrose, idose, arabinose, xylose, lyxose, ribose and alkoxylated derivatives thereof; and
   x is 1 to 30;
   (b) an aspartate component B comprising at least polyaspartic acid
   (c) a dialkyl glycol component C; and
   (d) at least one defoamer; and
   the corrosion inhibition method is corrosion inhibition in one selected from the group consisting of oil industry and gas industry.

2. The method according to claim 1, wherein the glycoside component A is at least one glycoside of the formula $R(OG)_x$ wherein
   R is an aliphatic hydrocarbon radical having 1 to 25 carbon atoms;
   G is a saccharide selected from the group consisting of fructose, glucose, mannose, galactose, talose, gulose, allose, altrose, idose, arabinose, xylose, lyxose, ribose and an alkoxylated derivative thereof; and
   x is 1 to 30.

3. The method according to claim 1, wherein R is a straight chain or branched alkyl group having 1 to 25 carbon atoms.

4. The method according to claim 3, wherein the straight chain or branched alkyl group has 4 to 20 carbon atoms.

5. The method according to claim 1, wherein G is glucose.

6. The method according to claim 1, wherein x is 1 to 10.

7. The method according to claim 1, wherein a ratio of wt-% (component A): wt-% (component B) is in the range of from 10:1 to 1:10.

8. The method according to claim 1, wherein the dialkyl glycol is dibutyl glycol.

9. The method according to claim 1, wherein a content of the dialkyl glycol is from 5.1 to 8.6 weight %.

* * * * *